Sept. 16, 1941.  A. A. BUSH  2,255,994
TIRE CONSTRUCTION
Filed Jan. 13, 1937  2 Sheets-Sheet 1
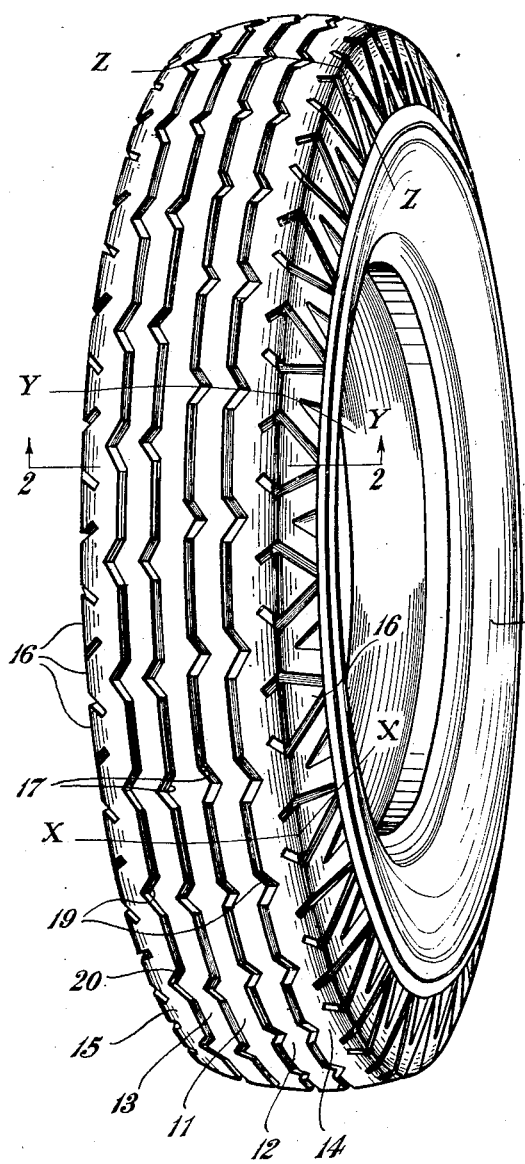
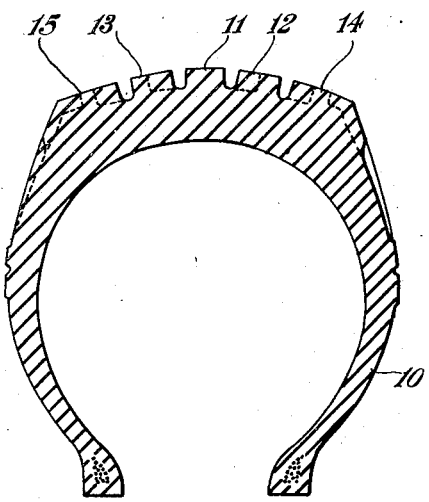
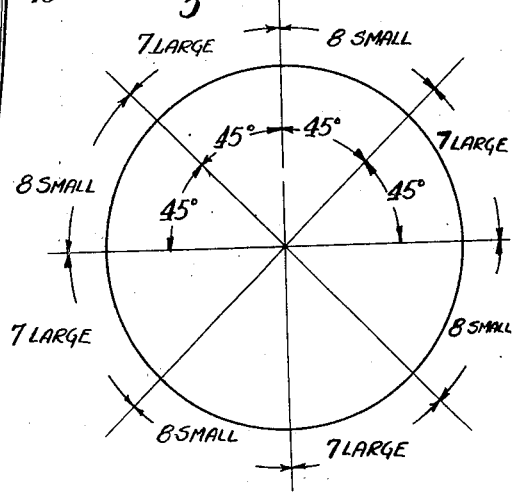
INVENTOR
Albert A. Bush, Dec'd.
By Firestone Park Trust and Savings Bank, Executor
Albert L. Ely
BY
ATTORNEY Patented Sept. 16, 1941

2,255,994

UNITED STATES PATENT OFFICE 2,255,994

TIRE CONSTRUCTION

Albert A. Bush, deceased, late of Akron, Ohio, by The Firestone Park Trust and Savings Bank, executor, Akron, Ohio, assignor to The Firestone Tire & Rubber Company, Akron, Ohio, a corporation of Ohio Application January 13, 1937, Serial No. 120,406

7 Claims. (Cl. 152—209)

This invention relates to tire constructions, and more especially it relates to arrangement and design of the tractive elements on the tread portions of pneumatic casings.

It is well known that vehicle tires such as pneumatic tires produce audible sounds when the vehicle is traveling over a roadway, which sounds originate with the impact of the tractive elements of the tire tread upon the roadway. Said sounds usually are of the nature of a hum or whine, the pitch and degree of which are relatively dependent upon the character or design of the tractive elements and the speed of rotation of the tire, higher speeds producing sounds of higher pitch.

It has been found that such tractive sounds may be substantially reduced or entirely suppressed by breaking up the periodicity of the sound-producing vibrations, and to this end it has been proposed in one case, to make the traction elements of a tire of irregular size and shape. Another expedient has been to vary the lengths of the said traction elements and/or the spaces between them in similar successive groups circumferentially of the tire. In all cases, however, the tread design has been of such irregularity that it has been difficult, if not impossible, to engrave a mold for producing the tire.

The chief object of the invention is to suppress tractive noises produced by a tire rotating upon a hard surfaced roadway by breaking up the periodicity of sound-producing vibrations; and to achieve the foregoing object by an arrangement of tractive elements on the tread of a tire that presents no especial mold-cutting problem. Other objects will be manifest as the specification proceeds.

Of the accompanying drawings:

Figure 1 is a perspective view of a tire casing embodying the invention;

Figure 2 is a section, on a larger scale, on the line 2—2 thereof;

Figure 4 is a diagrammatic view of tire indicating the groups of tread elements formed thereon.

Figure 3:
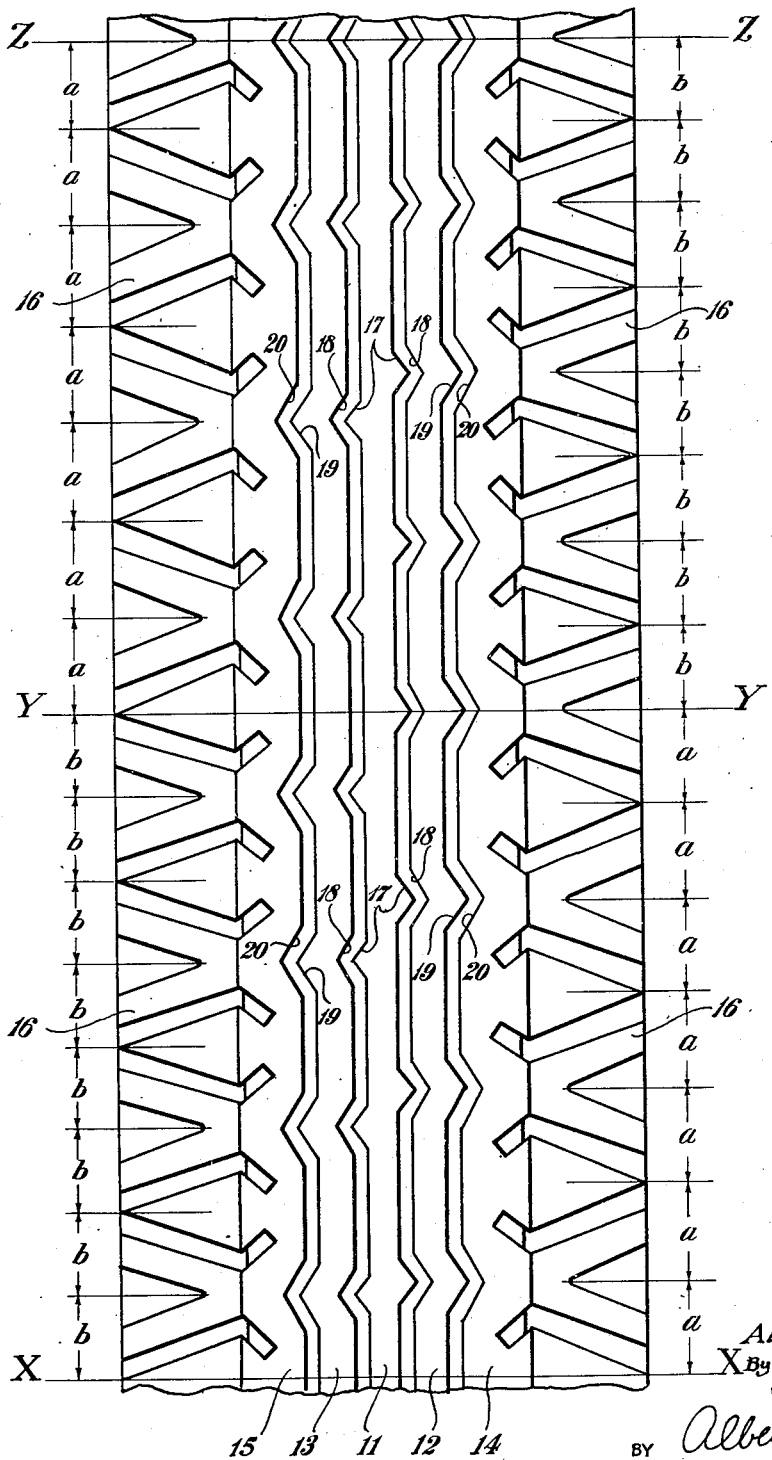
Figure 3 is a developed plan view, on a larger scale, of the tread portion of the tire shown in Figure 1.

Briefly stated, the tire embodying this invention comprises a tread portion consisting of traction elements of two slightly different sizes and spacings, the respective elements being arranged in groups comprising a plurality of identical elements, the two groups alternating in their disposition circumferentially of the tire, and being in staggered relation to each other transversely of the tire. The said traction elements may be individual characters, or they may be formed integral with continuous circumferential ribs on the tread of the tire. Solely for illustrative purposes, the latter arrangement is shown in the drawings.

Referring to the drawings, there is shown a pneumatic tire casing 10, the tread portion of which is formed with a central circumferential rib 11, separate lateral circumferential ribs 12, 13 at each side thereof, and separate circumferential portions 14, 15 disposed laterally of ribs 12, 13 and extending to the lateral margins of the tread, said marginal portions 14, 15 being formed with grooves defining non-skid traction elements 16, 16. The rib 11 is formed on opposite sides with angular projections 17, 17 which also serve as traction elements, and which are transversely aligned with similarly shaped notches, kerfs or indentations 18, 18 in the ribs 12, 13, and the outer marginal faces of the latter ribs are formed with angular projections 19, 19 likewise constituting traction elements that are transversely aligned with similarly shaped notches, kerfs or indentations 20, 20 in the marginal portions 14, 15. The notches 18 and projections 19 of the rib 12 are transversely aligned as are the similar notches and projections of the rib 13. The traction elements 16 of the marginal portions 14, 15 are arranged in a determinate relationship to the notches 20 in said marginal portions.

In the arranging of the said traction elements of the tire, the periphery of the tire is divided into an even number of sections, herein shown as eight, the juncture of some of the adjacent sections being indicated by the lines X—X, Y—Y, and Z—Z. As is clearly shown in Figure 3, the section between lines X—X and Y—Y on one side of the central plane of the tire, (the right side as shown) is divided into 7 equal spaces designated a, a, and on the left side of the tire the same section is divided into 8 equal spaces b, b, the equal spaces on the opposite sides of the tire representing the axes or centerlines of the traction elements 16, 16. The adjacent tire section, between the lines Y—Y and Z—Z is similarly divided, but in this case the 7 spaces a—a are on the left side of the tire and the 8 spaces b—b are on the right side. The staggered relation of the different spacings a—a and b—b is continued in successive sections about the periphery of the tire.

The traction elements of the tire, that is, the projections 17 and 19 of the ribs 11, 12, and 13, and the non-skid elements 16 at the lateral margins of the tread are positioned determinately with reference to the aforesaid spacings. Thus the projections 17 on the right hand side of rib 11 and the projections 19 on rib 12 are coincident with alternate spaces a—a in the section of the tire defined by lines X—X and Y—Y, and are coincident with alternate spaces b—b in the section of the tire between the lines Y—Y and Z—Z. In like manner the projections 17 on the left hand side of rib 11 and the projections 19 on rib 13 are coincident with alternate spaces b—b in the section of the tire between lines X—X and Y—Y, and are coincident with alternate spaces a—a in the adjacent tire section between lines Y—Y and Z—Z. Because of the difference in length of the spaces a and b, the spacing between the projections 17 and 19 on one side of the tire will differ from the spacing of the similarly designated projections on the other side of the tire, in every one-eighth section of the tire. Only at widely spaced points circumferentially of the tire will the projections 17, 19 on one side of the tire be in transverse alignment with those on the other side of the tire, and the relative positions of the projections on the respective sides of the tire progressively change between said points to produce a substantially asymmetrical tread design.

The traction elements 16 at the opposite lateral margins of the tire tread are arranged in determinate relationship to the adjacent projections 17 and 19 in that they are coincident with alternate spaces a—a or b—b as the case may be. The traction elements 16 are of such width in a circumferential direction that they occupy two of the spaces a or b, and form a continuous design about the tire. For this reason it is necessary that the traction elements 16 in the spaces a be somewhat larger than the traction elements in the spaces b, on the opposite side of the tire, but such difference in size is so small in the individual characters as not to destroy the uniform appearance of the tread design as a whole. The difference in size of the traction elements 16 also contributes to the asymmetrical nature of the tread design.

The difference in spacing of the traction elements on opposite sides of the tire is not sufficient materially to alter their traction characteristics. One of the important advantages of the tread is that tire molds for the same are easily cut. Thus but two different design-cams are needed on the mold-engraving apparatus, said cams being used in alernation as successive 45° sections of the mold are cut. The two halves of the mold are identical, the usual dowel pin or pins being provided to assure that in the assembling of the sections the spaces a of one mold section will be in alignment with the spaces b of the other mold section.

Because of the asymmetrical nature of the tread transversely of the tread, and the reversing of the spacing and size of the traction elements in adjacent arcs circumferentially of the tire, the sounds created by the tire become merely a complexity of vibratory noises that neutralize or co-mingle with each other, with the result that resonance is avoided and a diminution of sound is effected. The feature of associating the non-skid elements with ribs or the like that extend uninterruptedly circumferentially of the tire also makes for quietness, and in addition improves the wearing qualities of the tire for the reason that the projections or traction elements are not subject to "wiping action" and consequently are not rapidly worn away.

Figure 4 clearly shows that eight equal length arcuate groups of tread elements are formed in the tire construction of the invention. Note that alernate groups of tread elements on one side of the tire are formed from a different number of tread elements (of different size and spacing), but that the groups of the different sized elements are still of equal circumferential length.

Modification may be resorted to without departing from the spirit of the invention or the scope of the appended claims.

What is claimed is:

1. A tire having a traction tread composed of a plurality of traction elements arrange in successive groups around the circumference of the tire, on both sides of the centerline thereof, said groups being laterally aligned, the centers of the elements on one side of the centerline of the tire, in any group, being of different relative spacing in a circumferential direction from those of the same group on the opposite side of said centerline.

2. A combination as defined in claim 1 in which the traction elements are integral lateral projections of continuous circumferential ribs formed on the tire.

3. A tire having a traction tread comprising a plurality of traction elements arranged in successive groups around the circumference of the tire, on both sides of the centerline thereof, said groups being laterally aligned, the elements on one side of the centerline, in any group, being of different extent in a circumferential direction from those of the same group on the opposite side of said centerline.

4. A tire having a traction tread comprising a plurality of traction elements arranged in successive groups around the circumference of the tire, on both sides of the centerline thereof, said groups being laterally aligned, the elements on one side of the centerline, in any group, being equally spaced but of different extent and different relative spacing in a circumferential direction from the elements of the same group on the opposite side of said centerline, all of the elements in a group being of equal length in a circumferential direction.

5. A tire having a traction tread composed of a plurality of traction elements arranged in successive groups around the circumference of the tire, on both sides of the centerline thereof, said groups being laterally aligned, the elements on one side of the centerline of the tire, in any group, being of different relative spacing in a circumferential direction from those of the same group on the opposite side of said centerline, all of the elements in a group being of equal length in a circumferential direction, the relative spacing of the elements on opposite sides of the tire being reversed in successive groups.

6. A tire having a traction tread composed of a plurality of traction elements formed integral with a plurality of continuous ribs extending circumferentially of the tire, said traction elements being arranged in successive groups of equal length about the circumference of the tire, on both sides of the centerline thereof, said groups being laterally aligned, the elements on one side of the centerline of the tire, in every group, being of different relative spacing and different extent in a circumferential direction from those of the same group on the opposite side of said centerline, all of the elements in a group being of equal length in a circumferential direction, the relative spacing and widths of the elements on opposite sides of the tire being reversed in successive groups.

7. A tire having a traction tread comprising a plurality of continuous ribs extending circumferentially thereof, on both sides of the centerline of the tire, said ribs being separated by intervening grooves, and being formed with notches, kerfs, or indentations extending from said grooves into said ribs, said notches, kerfs or indentations being arranged in successive groups around the circumference of the tire, said groups being laterally aligned in the tire and being of the same circumferential length, the notches, kerfs or indentations on one side of the centerline of the tire, in any group, being at different relative spacing in a circumferential direction from those of the same group on the opposite side of said centerline.

THE FIRESTONE PARK TRUST AND
    SAVINGS BANK,
*Executor of the Last Will and Testament*
    *of Albert A. Bush, Deceased,*
By EDSON A. OBERLIN, JR.,
                      *President.*